(12) United States Patent
Rich et al.

(10) Patent No.: US 6,934,426 B2
(45) Date of Patent: *Aug. 23, 2005

(54) FIBER OPTIC SECURITY SENSOR AND SYSTEM WITH INTEGRATED SECURE DATA TRANSMISSION AND POWER CABLES

(75) Inventors: Brian Gerald Rich, Kanata (CA); William John Evenson, Mountain View, CA (US)

(73) Assignee: Senstar-Stellar Corporation, Carp (CA)

(*) Notice: Subject to any disclaimer, the term of this patent is extended or adjusted under 35 U.S.C. 154(b) by 231 days.

This patent is subject to a terminal disclaimer.

(21) Appl. No.: 10/266,696

(22) Filed: Oct. 9, 2002

(65) Prior Publication Data

US 2004/0071382 A1 Apr. 15, 2004

(51) Int. Cl.[7] .............................................. E21B 44/00
(52) U.S. Cl. ........................................ 385/12; 385/102
(58) Field of Search .......................... 385/12, 100, 101, 385/102, 105

(56) References Cited

U.S. PATENT DOCUMENTS

| | | | |
|---|---|---|---|
| 4,144,530 A | 3/1979 | Redfern | |
| 4,488,040 A | 12/1984 | Rowe | |
| 4,777,476 A | 10/1988 | Dank | |
| 5,138,153 A | 8/1992 | Gergely et al. | |
| 5,144,689 A | 9/1992 | Lovely | |
| 5,574,815 A | 11/1996 | Kneeland | |
| 5,808,730 A | 9/1998 | Danielian et al. | |
| 5,913,003 A | 6/1999 | Arroyo et al. | |
| 6,052,056 A | 4/2000 | Burns et al. | |
| 6,169,834 B1 | 1/2001 | Keller | |
| 6,195,487 B1 | 2/2001 | Anderson et al. | |
| 6,211,964 B1 * | 4/2001 | Luscombe et al. | 356/477 |
| 6,236,789 B1 | 5/2001 | Fitz | |
| 6,295,394 B1 | 9/2001 | Arab-Sadeghabadi | |
| 6,317,540 B1 * | 11/2001 | Foulger et al. | 385/100 |
| 6,381,397 B1 * | 4/2002 | Bevan et al. | 385/139 |
| 2002/0043969 A1 | 4/2002 | Duncan et al. | |
| 2004/0114888 A1 * | 6/2004 | Rich et al. | |
| 2005/0024210 A1 * | 2/2005 | Maki | 340/566 |

FOREIGN PATENT DOCUMENTS

| | | |
|---|---|---|
| EP | 0 603 450 A1 | 6/1994 |
| GB | 2 147 138 A | 5/1985 |
| WO | WO 00/37925 | 6/2000 |
| WO | WO 00/67400 | 11/2000 |

OTHER PUBLICATIONS

Fibre Optic Video Security Cable; published by Optical Cable Corporation; date unknown.

* cited by examiner

*Primary Examiner*—Daniel Stcyr
(74) *Attorney, Agent, or Firm*—John A. Merecki; Hoffman, Warnick & D'Allessandro LLC (57) ABSTRACT

A fiber optic security sensor cable and system for using the cable. The cable includes a optical fiber encased in a first jacket, a power cable encased in a second jacket, and an overjacket encasing both the first jacket and the second jacket where the fiber is utilized to securely transmit data and provide a response to a sensed disturbance to the sensor cable. The system provides secure data transmission and power distribution via the sensor cable where one optical sensing fiber along the path of a data fiber responds to a sensed disturbance to the sensor cable. The system's sensor cable is enabled to detect disturbances at a processing unit where the sensor cable is either physically routed adjacent to the processing unit or within the processing unit. The system can further include more than one processing unit in the form of auxiliary units such as repeaters, power amplifiers, power outlets, data routers, and any similar electronic device. The system can also include a plurality of processing units which are arranged along the data path, wherein the sensor cable is physically routed within at least one of the processing units. The system's processing units may include at least one that is a microprocessor based signal processor.

25 Claims, 5 Drawing Sheets

FIBER OPTIC SECURITY SENSOR AND SYSTEM WITH INTEGRATED SECURE DATA TRANSMISSION AND POWER CABLES

BACKGROUND TO THE INVENTION

1. Field of Invention

The present invention relates to a fiber optic sensor cable and a security sensor system. More particularly, the present invention relates to a security sensor cable having both optical sensing fiber, as well as power cables, within a secure cable jacket.

2. Discussion of the Prior Art

In the field of security sensor systems, outdoor sensors face challenges not found in indoor security situations. Environmental conditions, such as temperature extremes, rain, snow, animals, blowing debris, seismic effects, terrain and traffic, must all be taken into account. When functioning under these adverse conditions, the system must continue to maintain a high probability of detection while minimizing false alarms (alarms with unknown causes) and nuisance alarms (environment-related alarms), both of which may compromise and reduce the performance of the security system.

Fence and wall-associated sensors are above-ground detection sensors that are attached to an existing fence or wall. They detect intrusion when an intruder disturbs the detection field, or when strain or vibration due to cutting or climbing on a metal fabric fence triggers an alarm. INTEL­LIFIBER™ is a fiber-optic based fence-disturbance sensor for outdoor perimeter security applications from Senstar-Stellar Corp., of Carp, Ontario, Canada. This prior art fiber optic sensor can detect intruders cutting, climbing, or lifting fence fabric, and it provides protection circuitry against electromagnetic interference, radio frequency interference, and lightning. The system includes a programmable microprocessor that processes signals based on the changes in optical parameters generated as a result of disturbances in proximity to the fiber optic sensor cable. The microprocessor allows the user to calibrate and set operating parameters for specific zones/environments. Alarm processing optimizes detection and minimizes nuisance alarms from wind, rain, snow, fog, animals, debris, seismic activity, and the like.

There are various applications of INTELLIFIBER™ and similar fiber optic based security sensor systems. For example, one possible application is as an intrusion or disturbance detection system for communication centers. As security and disturbance detection systems at communication centers are crucial and must have a high probability of detection, certain environmental characteristics specific to the communication centers require that the system be uniquely calibrated to optimize detection. Due to the intense electromagnetic field environment that exists at these communications centers, security systems must also be able to operate without interference and also must avoid interfering with the on-site communication equipment. If the disturbance detection system were operating near a power station, similar environmental characteristics would be a consideration.

Figure 1:
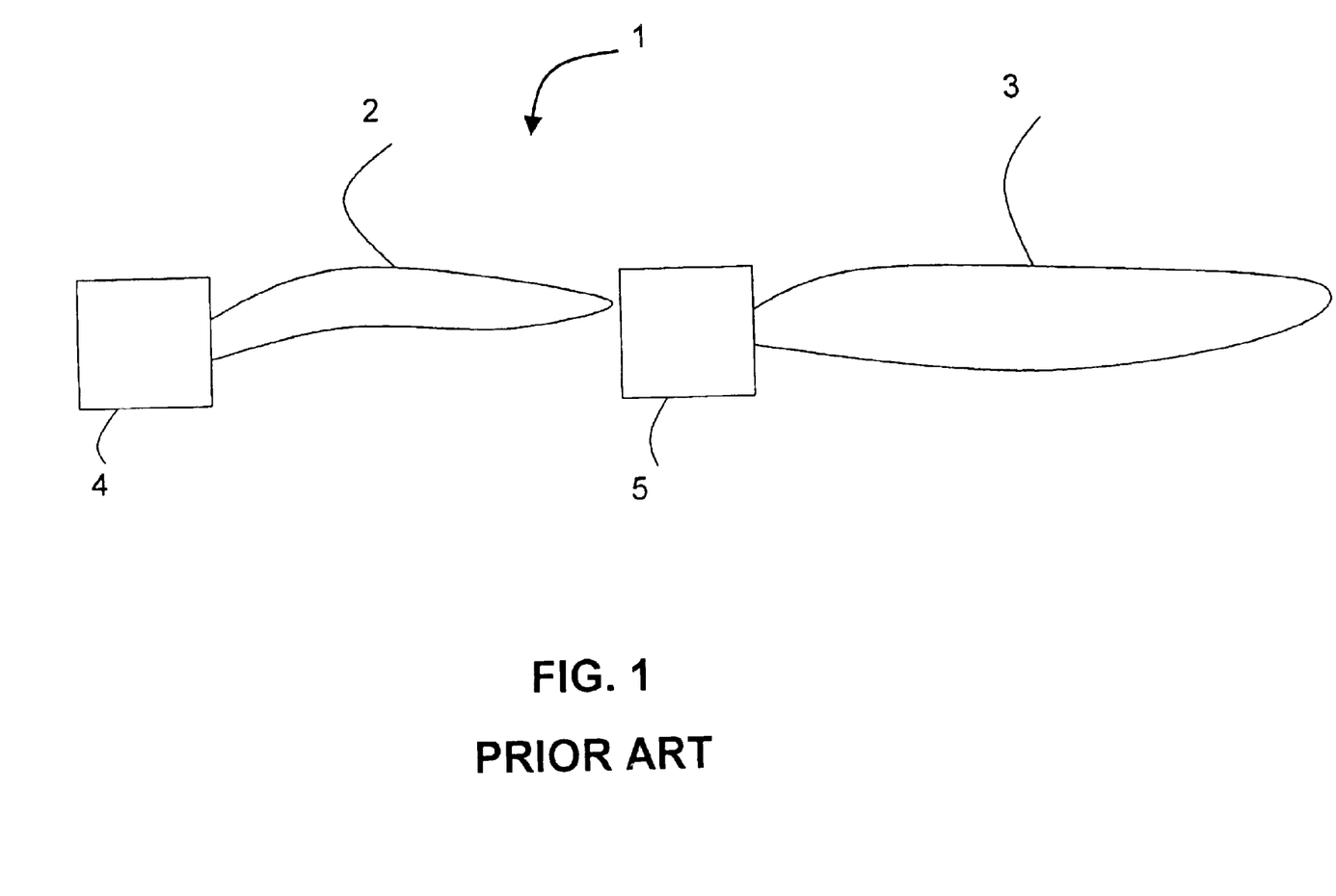
FIG. 1 is a block diagram of a security sensor system of the prior art.

FIG. 1, in the Drawings, is a block diagram of a security sensor system 1 of the prior art. The security sensor system 1 includes a first fiber optic sensor cable 2 and a second fiber optic sensor cable 3. Both cables 2 and 3 are shown in a loop back configuration. Each cable 2 and 3 is connected, at both end of the loops, to a first processing unit 4 and a second processing unit 5, respectively. Each of these processors may be connected to a central processing system (not shown). As such, each processing unit 4, 5 receives its power supply independent of the other processing units, and furthermore data signals are not transmitted between, or routed through, the processing units 4, 5. The prior art, for example, does not conceive of a first processing unit 4 providing power to the second processing unit 5 by utilizing a power cable coupled to both processing units 4 and 5, where the power cables and sensor cables form a single cable unit. Rather, in the prior art, the power cables would be run in parallel with the sensor cables but not coupled to the sensor cables.

In addition, a security sensor system must have intelligent processing means in order to optimize detection and minimize nuisance alarms, as well as being physically robust. The security system, and more particularly the fiber optic sensor cable, must be protected from adverse environmental conditions. Furthermore, the security system requires power conductor cables to provide power to the signal generation, detection, and data signal processing at the processing means of the security system. Accordingly, both the fiber optic sensor cables and the power conductor cables require protective layers that do not interfere with the disturbance detection function.

The Arroyo patent, U.S. Pat. No. 5,913,003, discloses a composite fiber optic cable having at least one optical fiber and at least one electrical power cable. Arroyo teaches that the power cables extend alongside a core containing the fiber optic cables. Arroyo requires that a strength jacket surround the core between the power cables and the fiber optic cables. The power cables and the fiber optic cables are both protected by an outer jacket. While Arroyo does teach distribution cables intended for use with remote terminals and an optical network unit, a security sensor system is not shown or suggested by Arroyo. Furthermore, Arroyo does not provide a primary jacket and a secondary jacket for the fiber optic cables and the power cables respectively.

The Keller patent, U.S. Pat. No. 6,169,834, discloses a slotted composite cable having a housing which encases a ribbon slot for optical fibers and a tubular slot for power cables, such as copper pairs. Keller teaches that the copper pairs provide central strength to the composite cable and effectively protect the optical fiber slots. Keller further teaches a composite cable for the purposes of communicating data, voice and power signals, however, there is no discussion of distributed networks or sensor systems. Still further, the discussion of the Keller prior art does not teach utilizing the cable composite for the purposes of security sensor systems.

The present invention seeks to provide a secure overjacket structure that is useful in preventing intruder tampering with the power cables. The present invention further seeks to provide a secure overjacket structure that protects both the fiber optic cabling and the power conductor cables, and ensures secure data transmission within a security sensor system. It is further advantageous to have both the fiber optic cabling and the power cables within a single protective jacket to eliminate the installation of both cables separately.

SUMMARY OF THE INVENTION

The present invention relates to a security sensor cable for a security sensor system, the security sensor cable having both optical sensing fiber, as well as power conductor cables within a secure cable jacket. By providing power conductor cables within a common secure cable jacket, the power conductor cables provide distributed power throughout the security sensor system along side the optical sensing fiber. According to the present invention, at least one optical sensing fiber is located in a primary jacket while the power conductor cables are located in a secondary jacket. The primary jacket may further encase fiber optic cables that are utilized for secure data transmission purposes rather than sensing purposes. An overjacket is provided to couple both the primary jacket with the secondary jacket. The overjacket further provides a protection layer from possible mechanical or environmental abrasion. A processing unit, attached to the optical sensing fiber, is provided to monitor the periphery of the overjacket and sense any tampering, by an intruder, to the power cables. The processing unit further provides signal generation, detection, analog-to-digital conversion, microprocessing means, signal processing, alarm output, and many other functions.

Previously in the prior art, the power conductor cables were located in the ground or mounted on structures either shared or separate from the sensor cables of the detection system while running in parallel with the sensor cables. The present invention is advantageous over the prior art in that the security sensor system can detect intruders cutting or tampering with the power conductor cables, as well as further detecting any other disturbance within proximity of the cabling. The present invention eliminates the necessity to monitor both the surroundings and the power cables using separate sensor means. While additional fiber optic cables may distribute some level of power optically, it is not practical for security sensor systems over large distributed networks. In distributed network applications, the use of power cables enables adequate power to be supplied throughout. The positioning of power cables, such as copper cables, within an overjacket enables processing units to monitor extensive fencing while providing adequate power distribution and detecting potential intruder tampering.

In a first aspect, the present invention provides a fiber optic security sensor cable including at least one optical sensing fiber encased in a first jacket, the optical sensing fiber providing detection and optionally secure data transmission; a power cable encased in a second jacket, the power cable providing power to the fiber sensor processing means; and an overjacket encasing both the first jacket and the second jacket; wherein the fiber is utilized to detect disturbances to the sensor cable. The sensor cable can include at least one data transmission cable within the overjacket. The data transmission cable can be a copper twisted pair, a single strand copper wire, an optical fiber ribbon cable, a coaxial cable, or any similar transmission medium. The sensor cable can be jacketed with an ultraviolet resistant material and can include more than one power cable within the second jacket.

In a second aspect, the present invention provides a security sensor system for providing secure data transmission and power distribution, the system including at least one processing unit having optical signal generation means, detection means, and signal processing means; and at least one sensor cable, each sensor cable including an optical fiber encased in a first jacket, a power cable encased in a second jacket, the power cable receiving power from a power supply and delivering it to the processing unit and hence providing optical power to the optical sensing fiber, and an overjacket encasing both the first jacket and the second jacket; a data path formed along at least one sensor cable to said processing unit; at least one optical sensing fiber is utilized to detect disturbances to said sensor cable; and at least one processing unit transmits data signals along said data path. The system's sensor cable is also configured to detect disturbances at the processing unit. The system's sensor cable can be either physically routed adjacent to the processing unit or within the processing unit. The system can further include more than one sensor cable, processing unit, or component selected from repeaters, power amplifiers, power outlets, data routers, and any similar electronic device. The system can also include that the processing units are arranged along the data path and the sensor cable is physically connected to or routed within at least one of the processing units. The system's processing units may include at least one that is a microprocessor based signal processor.

DETAILED DESCRIPTION

The present invention will now be described with reference to the drawings.

Figure 2:
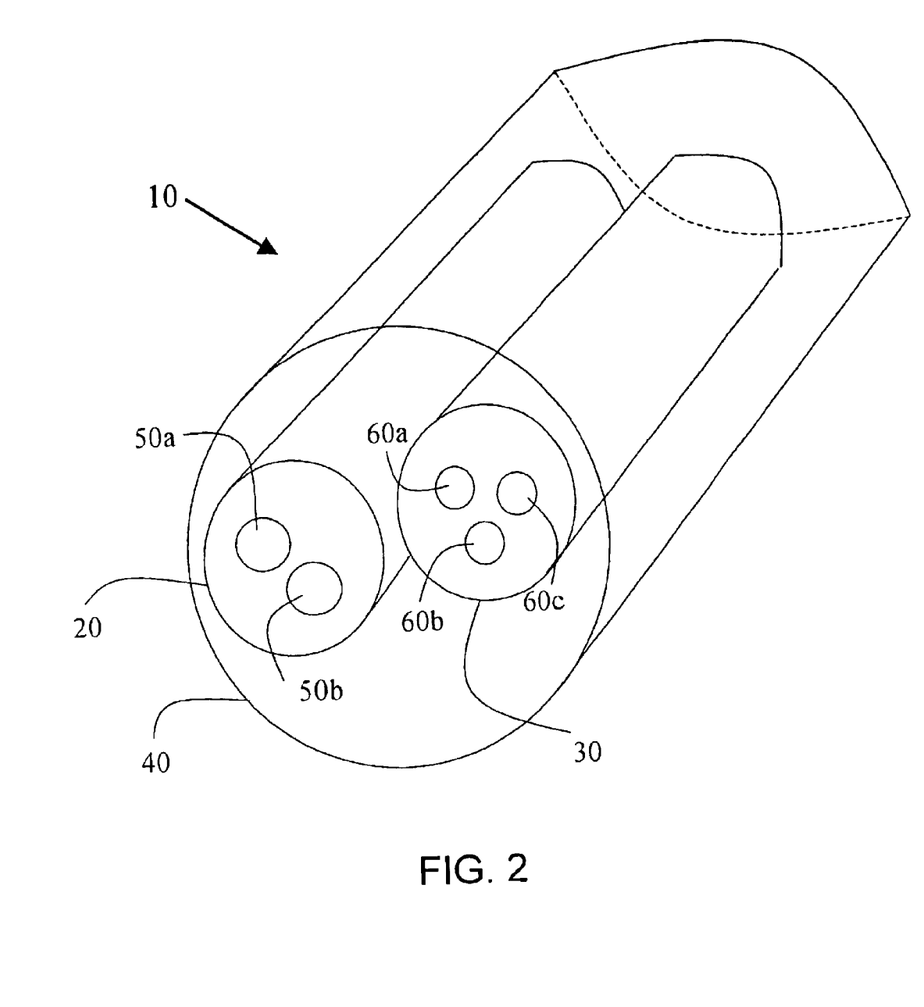
FIG. 2 is a schematic diagram of the security sensor cable according to the present invention.

Referring now to FIG. 2, a security sensor cable 10 of the present invention is illustrated. The security sensor cable 10 consists of a primary jacket 20, a secondary jacket 30, and an overjacket 40 in which the primary jacket 20 and the secondary jacket 30 are positioned collinearly, or coaxially. The primary jacket contains two fiber optic cables 50a, 50b. While only two fiber optic cables 50a, 50b are shown, the skilled artisan will understand that the fiber optic cables may be in the form of cabling bundles with multiple individual fibers in the primary jacket 20, or fiber optic cable ribbon, or the like. At least one of the two fiber optic cables 50a, 50b is an optical sensing fiber. For the purposes of this document, an optical sensing fiber is utilized to generate a response to a sensed disturbance in proximity of the sensor cable 10. It should be noted that the optical sensing fiber may further utilized in transmitting secure data signals, i.e. both optical sensing signals and secure data signals are multiplexed along a single optical sensing fiber. The secondary jacket 30 contains power conductor cables 60a, 60b, and an auxiliary data cable 60c. The overjacket 40 defines a secure area having a diameter that is wide enough to contain both the primary jacket 20 and the secondary jacket 30.

The utilization of a bundled jacket structure, as in FIG. 2, permits security sensor systems that do not require separate installation of sensor power and communication. The cable material chosen may further increase the advantages of utilizing an overjacket 40 according to the present invention. If the sensor system were intended for underground applications, the overjacket 40 may require a waterproof layer. Materials, such as polyethylene, polyvinyl chloride or stainless steel, or any similarly suitable waterproof layer may be used in the overjacket 40. Depending on the environment, the diameter of the overjacket 40, and inherently the secure area, may need to be enlarged or reduced.

The coaxial nature of the overjacket requires that its circumferential thickness vary to accommodate the installation and environment wear and tear of a particular material and application. Alternatively, the overjacket 40 may be form fit around jackets 20, 30 by any method or manner such as, but not limited to, heat shrinking depending upon the material used, or may contain tensile or filler members such as Kevlar™.

It should be mentioned that security sensor cable 10 of the present invention may be buried in the ground. Accordingly, the security sensor cable 10 would require a rodent resistant layer along the overjacket 40. It is conceivable that the same security sensor cable may be buried partly in the ground and partly above ground on a given structure.

According to one embodiment of the present invention, the fiber optic cables 50a, 50b, may be a standard commercial fiber optic cables selected for their detection or data communications properties. The entire security sensor cable 10, which would include the ultraviolet resistant overjacket, may be further attached to a fence by means of ultraviolet resistant cable ties (not shown). One or more of the fiber optic cables 50a, 50b will communicate optical signal changes, based on minute flexing of it, when an attempt is made to cut, climb, or lift fence fabric for example, or more particularly to disturb the security sensor cable 10. In this embodiment, the secondary jacket 30, of FIG. 2, may alternatively enclose solely a plurality of power conductor cables.

The combination of both power conductor cables and auxiliary data cables provide both power and data transmission respectively along the sensor cable. The possible use of the secondary jacket 30, and the data cables therein, provides additional or alternative data transmission means through the sensor cable 10. As such, the sensor cable 10 may provide multiple functions if implemented in a security sensor system. For example, the data cable 60c may provide audio or video detection throughout a security system while the fiber optic cables 50a, 50b would transmit data signals.

Figure 3:
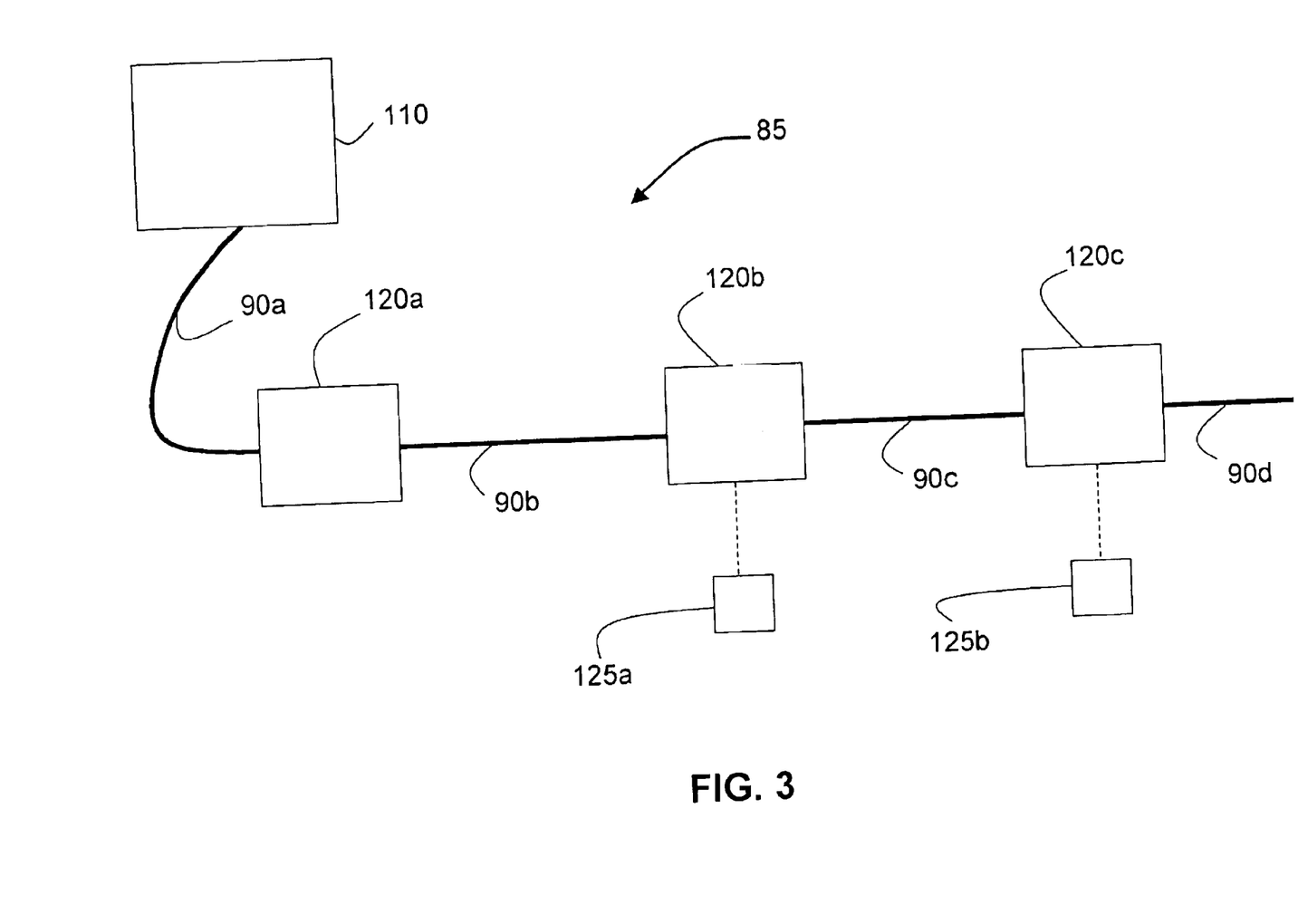
FIG. 3 is a block diagram of a security sensor system having a fiber optic sensor cable according to a first embodiment of the present invention.

FIG. 3 is a block diagram of a security sensor system 85 having a security sensor cable equivalent to 10, of FIG. 2, according to a first embodiment of the present invention. The security sensor system 85 includes a plurality of security sensor cables 90a, 90b, 90c and 90d, as detailed in FIG. 2, a main processing unit 110, and three secondary processing units 120a, 120b, 120c. The main processing unit 110 is in communication either directly or indirectly with the secondary processing units. While the main processing unit receives overall system security data, the secondary processing units may be required to perform certain functions in response to activities in their local sensing cables. Each of the secondary processing units 120a, 120b, 120c may process data signals received from security sensor cables 90a, 90b, 90c and 90d directly coupled to a given processing unit.

Two of the secondary processing units 120b and 120c are optionally coupled to video surveillance camera 125a and 125b, respectively. Either of the cameras 125a, 125b may be activated by the corresponding processing units 120b, 120c, or the main processing unit if a disturbance is detected in proximity of the sensor cables 90b, 90c, 90d. As mentioned earlier in FIG. 2, a data cable similar to the data cable 60c, located in the secondary jacket 30, may be selected to communicate video data signals in response to detection of a disturbance by a given processing unit 120a, 120b, 120c, or for monitoring purposes.

Alternatively, various data signals may be multiplexed with optical signals along a common optical sensing fiber forming part of the security sensor cables. The data signals and the optical signals may be multiplexed along a single optical sensing fiber based on time division or frequency.

Figure 4:
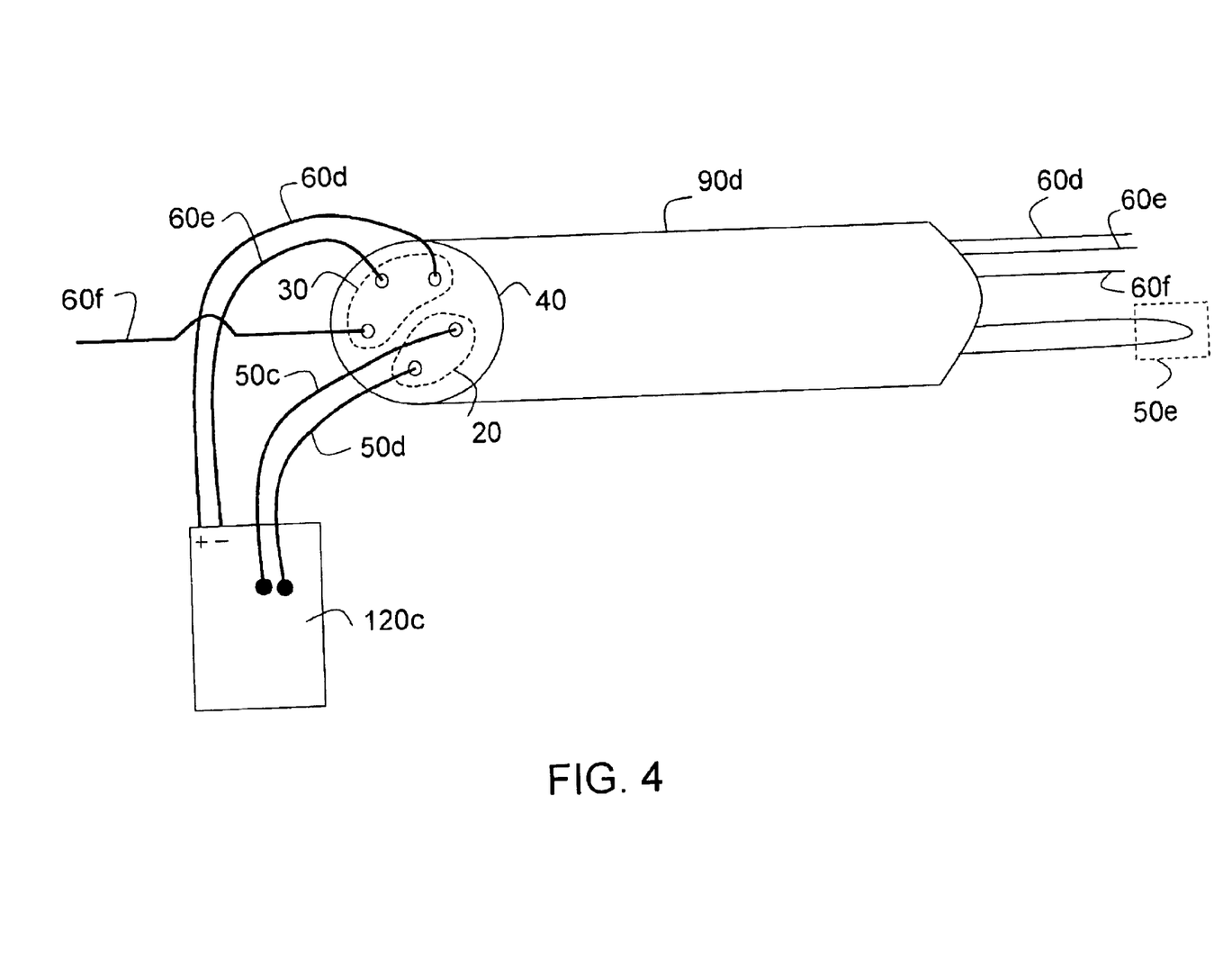
FIG. 4 is a schematic diagram of a security sensor cable coupled to a processing unit according to a second embodiment of the present invention.

In FIG. 4, the sensor cable 90d of FIG. 3 is illustrated, in which the physical connections between the various fiber optic, power, and data cables 50c, 50d, 60d, 60e, and 60f and a given processing unit 120c are further detailed, according to the present invention. The fiber optic cable ends 50c, 50d are similar to the two fiber optic cables 50a, 50b of FIG. 2 in that the fiber optic cable ends 50c, 50d are encased in a primary jacket 20 outlined in dashed lines. Also, the power conductor and data cables 60d, 60e, 60f, illustrated in FIG. 4, are similar to the power conductor and data cable 60a, 60b, 60c of FIG. 2. The power conductor cables and the data cables are encased in a secondary jacket 30 outlined in dashed lines. In FIG. 4, the power conductor cables 60d, 60e are connected to the processing unit 120c, whereas the data cable 60f is terminated elsewhere. While the data cable 60f may be further connected to the processing unit 120c, it is not required Both the primary jacket 20 and the secondary jacket 30 are further encased in an overjacket 40 similar to that of FIG. 2. The fiber optic cable ends 50c, 50d are connected in a loop back 50e, as outlined by the dashed box. While some fiber optic cables may be connected on either end to independent processing units, the loop back 50e illustrates that detection may be provided through use of a single fiber optic cable strand, comprised of fiber optic cable ends 50c, 50d and a loop back 50e linked solely to a single processing unit 120c. By utilizing the loop back arrangement 50e within the primary jacket 20, the security sensor system 85 of FIG. 3 may monitor certain areas with a single processing unit 120c and sensor cable 90d. As shown in FIG. 3, the loop back arrangement 50e of the sensor cable 90d protects the end line/zone of the security system. Accordingly, an additional processing unit, attached to the other end of sensor cable 90d, would not be required.

At the processing unit 120c, one fiber optic cable end 50c is attached to an optical light source (not shown), such as a laser diode, and the other fiber optic cable end 50d is attached to a light source detection means (not shown). The light source detection means converts an optical signal, detected by the light source detection means, to a voltage value. This voltage value is then processed by a microcontroller within the processing unit 120c. Within a given security system, the voltage values may either be processed at the corresponding processing unit or transmitted along the data transmission cables for further processing at a main processing unit.

Figure 5:
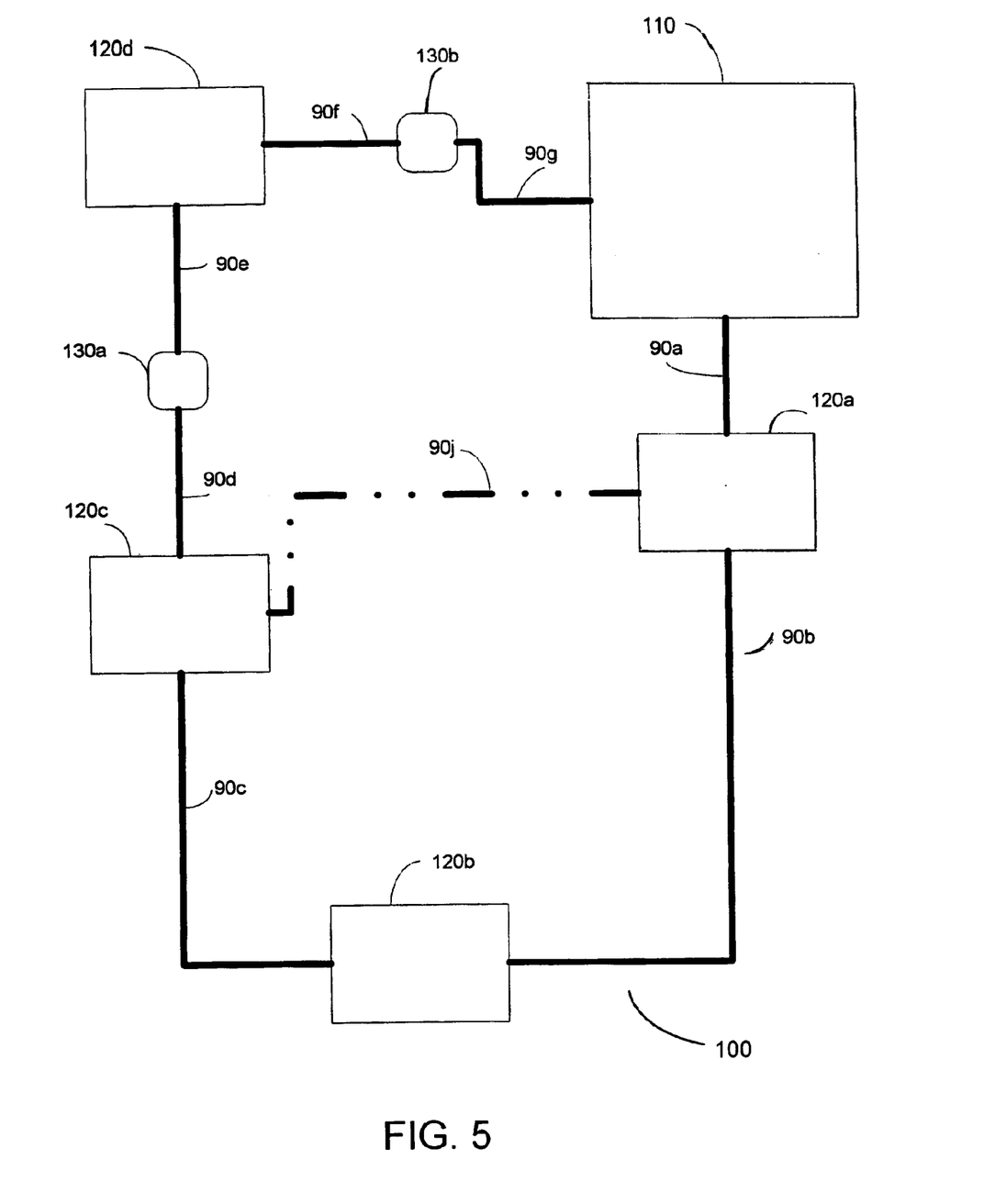
FIG. 5 is a block diagram of a security sensor system implemented in a distributed data network according to a second embodiment of the present invention.

FIG. 5 is a block diagram of a security sensor system 85, of FIG. 3, within distributed data network 100 according to a second embodiment of the present invention. The distributed data network 100 is an example of one implementation of the security sensor cable 10 of FIG. 2. In FIG. 5, the security sensor cable 10 is shown in the form of a plurality of security sensor cables 90a, 90b, 90c, 90d, 90e, 90f, and 90g, hereinafter termed security sensor data paths. Although the security sensor cables 90c, 90d, 90e, 90f, and 90g, are illustrated as separate security sensor cables they may be formed of a single security cable. To further clarify, the security sensor cables 90a, 90b, 90c, 90d, 90e, 90f, and 90g may be placed along the periphery of, or within, the various units 120a, 120b, 120c, 120d, 130a, and 130b. It is not necessary to break the security sensor cable at each unit 120a, 120b, 120c, 120d, 130a, and 130b in the data network 100. Only a few fiber optic cables, for data or sensing purposes, along with power conductor cables, are required from the sensor cable to sense disturbances or provide power to a particular unit. Accordingly, the necessary cables may be removed from the sensor cable at a particular unit without forming a break in the sensor cable. Hereinafter, the plurality of security sensor cables 90a, 90b, 90c, 90d, 90e, 90f, and 90g are termed security sensor data paths.

While it is discussed herein below that the security sensor cable 10 is utilized to securely transmit signals and generate a response to a sensed disturbance, it should be understood what is meant is that flexing, breaking, or any sort of physical movement to the sensor cable 10 results in a distortion of the signal within at least one of the fiber optic sensor cables 50a, 50b and it is such distortion that is sensed and can be used to generate a signal that can be processed to indicate a security breach. This generated signal can be analyzed to detect patterns such as climbing of a fence protected by the invention while ignoring patterns such as rain falling upon the fence. It should be understood that one skilled in the art of signal processing would be able to program the main processing unit for differentiating patterns within the intended scope of the present invention.

The distributed data network 100 consists of a main processing unit 110 and four secondary processing units 120a, 120b, 120c, 120d. The data network 100 also includes a plurality of auxiliary units 130a and 130b. Along the security sensor data paths 90a, 90b, 90c, 90d, 90e, 90f, 90g, the secondary processing units 120a, 120b, 120c, 120d detect breaks, intruders, tampering, or any other activity which would jeopardize the security of the auxiliary units 130a, 130b. According to the present invention, the auxiliary units 130a, 130b may be, for example, repeaters to boost sensing signals within the data network, power amplifiers, power outlets, data routers, or other electronic components. Furthermore, it is not necessary that the auxiliary units 130a, 130b, 130c, 130d be identical to one another.

In an alternative embodiment, the secondary processing units 120a, 120b, 120c, 120d may have auxiliary functions, in addition to data processing, such as data routing or data switching. For example, a data router would be capable of performing certain additional processing functions, such as data compression, on the data prior to transmission main processing unit 110. The processing units distributed within the data network 100 may further receive and/or process the optical data signals from the sensor. The failure of one processing unit does not affect the optical data signal processing of the other processing unit within the data network 100. This can be accomplished by routing the sensor data paths 90a, 90b, 90c, 90d, 90e, 90f, 90g, adjacent to each auxiliary unit 130a, 130b rather than physically through each auxiliary unit 130a, 130b such that each sensor data path 90a, 90b, 90c, 90d, 90e, 90f, 90g is electronically independent from the auxiliary units 130a, 130b.

The data network 100 is capable of supporting dual redundant data paths. Dual redundant data paths allow network communications to continue in the event that either of the data paths fails. In FIG. 5, a redundant data path 90j is located in the data network 100 to provide an alternate data path from the secondary processing unit or in combination with at least one of the data paths 90b, 90c, 90d, 90e, 90f, 90g. In the event of a sensor cable being cut or damaged, and as such a data path is compromised, using additional sensor cable along a given data path may repair the sensor cable. The sensor cable would be similar to the sensor cable 10 of FIG. 2.

Within the data network 100, data signals from the security sensor cables may be received at a main processing unit via one or more of the security data paths 90b, 90c, 90d, 90e, 90f, and 90g. The data network 100 may also deliver test, maintenance, control and alarm response signals through use of the auxiliary data cables that form part of the security sensor cables. The main processing unit 110, as well as the secondary processing units 120a, 120b, 120c, 120d may process this type of data. Units, for processing 120a, 120b, 120c, 120d, or otherwise 130a, 130b, located throughout the data network 100, are protected by placing the security sensor cables through the given unit. Such sensor cable installations not only protect against cable tampering but also against tampering with the essential system units.

For example, the security system may function as an electronic perimeter intrusion detector. Accordingly, the security sensor system would be used in conjunction with fences to protect the perimeter of a site. The security sensor system would consist of a security sensor cable 10 as in FIG. 2, and a microprocessor based signal processor. In this case, the system would be capable of monitoring different styles of metal fabric fencing such as chain-link, expanded-metal or welded-mesh fence. The security sensor system would detect intruders by processing optical signals modified by the minute flexing of the fiber optic sensor cable, caused by attempting to cut, climb, or raise the fence fabric. The fiber optic sensor cable may also be buried in the ground or in a wall to detect vibration or tampering (e.g. cut through a wall, building ceiling etc.). As stated previously, the fiber optic sensor cables detect optical signal changes, based on minute flexing of any one of the fiber optic sensor cables, when an attempt is made to cut, climb, or lift the fence fabric, or more particularly to disturb the security sensor cable.

The signal processing means within a particular processing unit of the sensor security system utilizes the optical signals generated in response to a sensed disturbance to the fiber optic sensor cable. The signal processing means further analyses the data signals that are in response to minute vibrations in the fabric of the fence. Through utilization of adaptive algorithms, ambient signal compensation and selectable common-mode rejection, the system discriminates between actual disturbances and false nuisance alarms, without lowering the probability of detection. For instance, a cut intrusion and a climb intrusion would be distinguished by the signal processing means. Furthermore, the signal processing means may have independent adjustments and thresholds for each type of intrusion and detection, and may have the capability to completely mask or cut alarms. These digital signal-processing techniques may be employed in adaptive algorithms to enable the system to adapt to specific fence types and various environmental conditions.

The security sensor system is also capable of creating site-specific maps and databases that include the equipment and features of individual sites and security systems. Based on the requirements of each individual site, the security sensor may be customized to provide any number of security sensor data paths, redundant or critical, to form a data network.

A person understanding the above-described invention may now conceive of alternative designs, using the principles described herein. All such designs that fall within the scope of the claims appended hereto are considered to be part of the present invention.

What is claimed is:

1. A fiber optic security sensor cable forming part of a fiber optic security sensor system comprising:
   at least one optical sensing fiber encased in a first jacket, said fiber providing detection of intrusion;
   a power cable encased in a second jacket, said power cable providing power to said fiber optic security sensor system; and an overjacket encasing both said first jacket and said second jacket;

wherein said at least one optical sensing fiber is utilized to generate a response to a sensed disturbance to said sensor cable.

2. A fiber security sensor cable as claimed in claim 1, further including at least one data transmission cable within said primary jacket.

3. A fiber security sensor cable as claimed in claim 2, wherein said at least one data transmission cable is selected from the group consisting of fiber optic cable, fiber optic cable ribbon, and fiber optic cable bundles.

4. The sensor cable as claimed in claim 1, further including more than one said power cable within said second jacket.

5. The sensor cable as claimed in claim 1, further including at least one data transmission cable within said second jacket.

6. The sensor cable as claimed in claim 5, wherein said at least one data transmission cable is selected from the group consisting of copper coaxial cable, copper twisted pairs, single strand copper wire, fiber optic cable, fiber optic ribbon cable, multi-conductor copper cable, and fiber optic cable bundles.

7. The sensor cable as claimed in claim 1, wherein said overjacket is formed from an ultraviolet resistant material.

8. A security sensor system for providing secure data transmission and power distribution, said system comprising:

at least one processing unit having data signal processing means; and at least one sensor cable, each said sensor cable including at least one optical sensing fiber encased in a first jacket, a power cable encased in a second jacket, said power cable receiving power from a power supply means and providing power to said processing unit, and an overjacket encasing both said first jacket and said second jacket; and a data path formed along said at least one sensor cable to said processing unit;

wherein said at least one optical sensing fiber is utilized to generate an optical signal in response to a sensed disturbance to said sensor cable.

9. A security sensor system for providing secure data transmission and power distribution, said system comprising:

at least one processing unit having data signal processing means; and at least one sensor cable, each said sensor cable including at least one optical sensing fiber encased in a first jacket, a power cable encased in a second jacket, said power cable receiving power from a power supply means and providing power to said processing unit, and an overjacket encasing both said first jacket and said second jacket; and a data path formed along said at least one sensor cable to said processing unit;

wherein said at least one optical sensing fiber is utilized to generate an optical signal in response to a sensed disturbance to said sensor cable; and wherein said at least one processing unit transmit data signals along said data path.

10. The system as claimed in claim 9, wherein said data path is a data transmission cable selected from the group consisting of copper coaxial cable, copper twisted pairs, single strand copper wire, fiber optic cable, fiber optic ribbon cable, multi-conductor copper cable, and fiber optic cable bundles.

11. The system as claimed in claim 9, wherein said data signals are multiplexed with said optical signal along said at least one optical sensing fiber.

12. The system as claimed in claim 8 or 9, wherein said sensor cable is enabled to detect disturbances at said processing unit.

13. The system as claimed in claim 12, wherein said sensor cable is physically routed adjacent to said processing unit.

14. The system as claimed in claim 12, wherein said sensor cable is physically routed within said processing unit.

15. The system as claimed in claim 14, wherein said processing units are arranged along said data path and said sensor cable is physically routed within at least one of said processing units.

16. The system as claimed in claim 15, wherein at least one of said processing units is a microprocessor based signal processor.

17. The system as claimed in claim 16, wherein at least one of said processing units is an auxiliary unit selected from the group consisting of signal repeaters, power amplifiers, power outlets, splitters, transponders, and data routers.

18. The system as claimed in claim 12, further including more than one said processing unit.

19. The system as claimed in claim 18, wherein at least one of said processing units is a microprocessor based signal processor.

20. The system as claimed in claim 19, wherein at least one of said processing units is an auxiliary unit selected from the group consisting of signal repeaters, power amplifiers, power outlets, splitters, transponders, and data routers.

21. A security sensor system for providing detection and power distribution, said system comprising:

at least two processing units; and at least one sensor cable forming a detection data path between said at least two processing units, each of said at least one sensor cable including at least one optical sensing fiber and a power cable encased in an overjacket; and wherein said at least one optical sensing fiber is utilized to generate an optical signal in response to a sensed disturbance to said sensor cable.

22. A security sensor system for providing detection and power distribution, said system comprising:

at least two processing units; and at least one sensor cable forming a detection data path between said at least two processing units, each of said at least one sensor cable including at least one optical sensing fiber and a power cable encased in an overjacket; and a secure data path formed along said at least one sensor cable;

wherein said at least one optical sensing fiber is utilized to generate an optical signal in response to a sensed disturbance to said sensor cable.

23. A security sensor system as in claim 22, wherein said secure data path is a data transmission cable is selected from the group consisting of copper coaxial cable, copper twisted pairs, single strand copper wire, fiber optic cable, fiber optic ribbon cable, multi-conductor copper cable, and fiber optic cable bundles.

24. A security sensor system for providing secure data transmission and power distribution, said system comprising:

at least two processing units; and at least one sensor cable forming a detection data path between said at least two processing units, each of said at least one sensor cable including at least one optical sensing fiber and a power cable encased in an overjacket; and a secure data path formed along said at least one sensor cable between said at least two processing units;

wherein said at least one optical sensing fiber is utilized to generate an optical signal in response to a sensed disturbance to said sensor cable; and wherein said at least two processing units securely transmit data signals along said secure data path.

25. A security sensor system as in claim 24, wherein said secure data path is a data transmission cable is selected from the group consisting of copper coaxial cable, copper twisted pairs, single strand copper wire, fiber optic cable, fiber optic ribbon cable, multi-conductor copper cable, and fiber optic cable bundles.

* * * * *